Jan. 7, 1936.                    O. B. HUNT                    2,026,896
              SEMIAUTOMATIC NONBACKING AUTOMOBILE BRAKE
                          Filed July 26, 1933
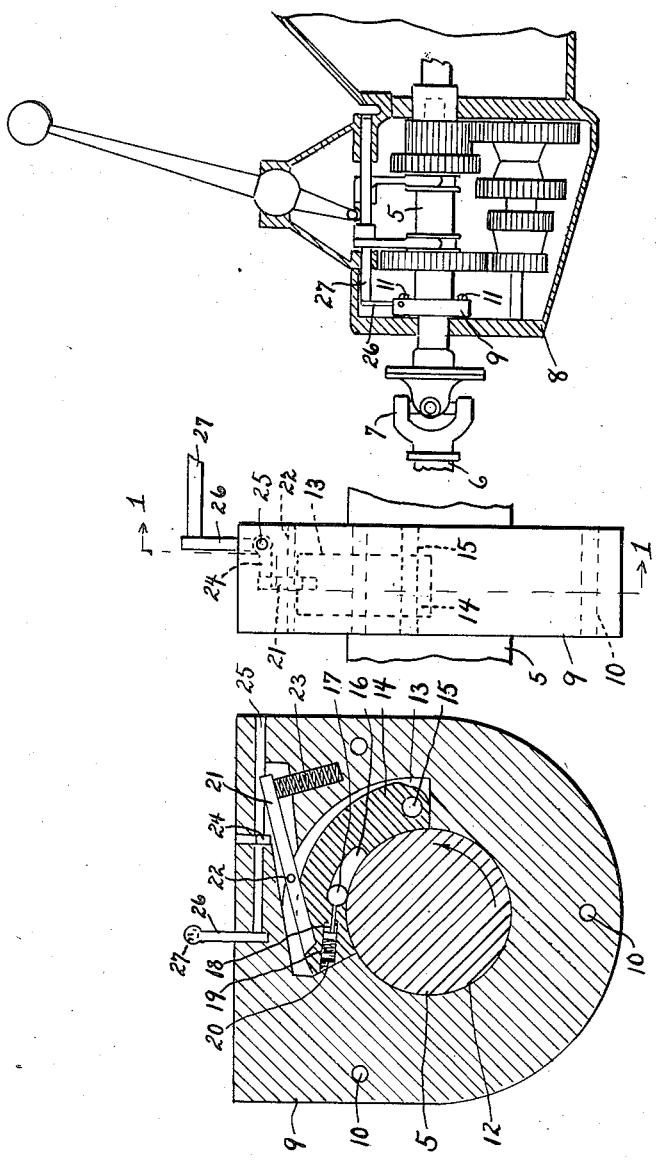
INVENTOR
Otis B. Hunt
By W. W. Williamson
         Atty.

Patented Jan. 7, 1936

2,026,896

UNITED STATES PATENT OFFICE 2,026,896

SEMIAUTOMATIC NONBACKING AUTOMOBILE BRAKE

Otis B. Hunt, Croyden, Pa.

Application July 26, 1933, Serial No. 682,238

4 Claims. (Cl. 192—4)

My invention relates to new and useful improvements in a semi-automatic non-backing automobile brake, and more particularly has reference to improvements on the invention illustrated in my copending application, Serial Number 633,028, filed September 14, 1932, allowed June 2, 1933 which has eventuated in Patent No. 1,933,265, dated October 31, 1933.

One of the objects of the invention is to provide a device of this character which will automatically prevent the backward drifting of an automobile when stopped on an incline but which will be made inoperative when the gears are shifted for reverse movement of the automobile.

Another object of the invention is to provide a non-backing automobile brake wherein a hinged segment is provided to control the operations of the braking element, which segment will be released when the gears are shifted into reverse positions and will automatically assume its normal position when the gears are shifted into some other position and the automobile is operated.

A further object of the invention is to provide means tending to urge the braking means into an operative position in order to prevent the latter sticking in its inoperative position due to grease accumulating on the same.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a section on the line 1—1 of Fig. 2, illustrating one arrangement of the mechanism and the relation to a shaft.

Fig. 2 is a side elevation or edge view thereof with some of the parts shown in dotted lines.

Fig. 3 is a view partly in section and partly in elevation of an automobile transmission illustrating the relation of my invention thereto, which is shown on a reduced scale.

In carrying out my invention as herein embodied, 5 represents the transmission shaft of an automobile transmission mechanism with which the proper shaft 6 is connected by the forward universal joint 7.

At some suitable location, as within the transmission housing 8 and surrounding the clutch shaft is a collar or casing 9 having any desirable number of holes 10 therethrough whereby the said casing or collar may be fastened in place to some suitable support as to one of the walls of the transmission housing by bolts 11 or equivalent securing means.

This collar or casing 9 has an opening 12 therethrough for the passage of the shaft 5 and communicating with said opening 12 is an aperture 13 of sufficient size to receive and permit operation of the controlling segment 14, the latter being hinged or pivoted at one end on a pin or axle 15. The inner concave surface of said segment fits the circumference of the shaft 5 fairly snug but enough "play" is allowed to permit said segment to swing to and fro relative to the shaft.

In the inner face of the segment is formed a longitudinal groove 16 in which is mounted the braking element 17 such as a roller or a ball. Said groove 16 decreases in size from one end toward the other, clockwise as shown in Fig. 1, so that when the shaft 5 revolves in a clockwise direction the braking element 17 will be wedged in between said shaft and a wall of the groove to finally prevent clockwise movement of said shaft. The end of the groove where the element 17 is shown located in Fig. 1 is large enough to permit the element 17 to freely revolve when the shaft 5 is revolving in a counter-clockwise direction.

As the collar or casing 9 is located within the transmission housing 8, grease will accumulate in the groove 16 and to prevent the element 17 from sticking in its inoperative position a sliding plunger 18 is mounted in a hole communicating with the larger end of the groove 16 so as to contact the element 17 and this plunger is provided with a head against which one end of a spring 19 operates, the other end of said spring engaging a screw plug 20 all of which are arranged in the control segment 14.

This control segment 14 is held in its normal or operative position as shown in Fig. 1, by a catch 21 pivoted intermediate its ends as at 22 whereby the nose of said catch may be moved into engagement with a keeper notch in the free end of the control segment 14 by a spring 23 coacting with the tail of the catch.

In order to disengage the nose of the catch from its keeper notch the tail of said catch is to be depressed by the arm 24 of a bell crank lever which includes said arm, a rod 25 rotatably mounted in the collar and on which said arm 24 is mounted and also another arm 26 attached to said rod 25, the latter arm being located in the path of travel of the shifting rod 27 of the transmission mechanism.

By referring to Fig. 1, which is a view of the device looking from the back toward the power end of an automobile, the shaft 5 is illustrated as revolving counter-clockwise. Said shaft 5 is free to thus revolve even with my device applied thereto, since such direction of revolution tends to roll the element 17 into the larger part of the groove 14 where it will be free to revolve. Whenever the automobile with this device applied tends to drift rearwardly the shaft 5, as illustrated in Fig. 1, will be revolved in a clockwise direction causing the element 17 to move toward the smaller end of the groove 16 and be wedged between a wall of said groove and the surface of the shaft finally preventing said shaft from turning.

When it is desirable or necessary to run the automobile in a reverse direction, the transmission gears are shifted in the usual manner and the shift rod 27 will engage the arm 26 and force the free end thereof rearwardly. This action will rotate the rod 25 and move the free end of the arm 24 downward so as to depress the tail end of the catch 21. Said catch is thus disengaged from the keeper notch in the control segment 14 and said control segment will be released. Now when the shaft 5 is revolved in a reverse direction, or clockwise as shown in Fig. 1, the element 17 in moving toward the smaller end of the groove 16 will merely raise the control segment 14 and the shaft 5 can continue to revolve in the reverse direction.

When the transmission gears are shifted from the reverse position to some other position and the automobile is driven forward, the movements of the shaft 5 will cause the element 17 to travel into the larger end of the groove 16 which will permit the control segment 14 to assume its normal position and the nose of the catch 21 will be forced into engagement with the keeper notch by the spring 23 so that the parts are again in condition to prevent accidental backward movement of the automobile.

Of course I do not wish to be limited to the exact details of construction herein shown and described as these may be varied within the limits of the appended claims without departing from the spirit of my invention.

Having thus fully described my invention, what I claim as new and useful is:—

1. In combination, an automobile transmission mechanism, a casing surrounding the transmission shaft and held in a stationary position, a segment pivoted at one end within said casing and coacting with the shaft when in its operative position, said segment having a keeper notch at the free end, a spring actuated catch within the casing and coacting with the keeper notch to normally hold the segment in its operative position, a roller mounted in a groove in the concave surface of the segment, said groove tapering in the direction opposite the normal direction of rotation of the shaft, said roller being located in the larger end of the groove when the shaft is revolving in its normal direction but tending to move toward the smaller end of the groove when the shaft is reversed to prevent retrograde movement of said shaft, and a bell crank lever journalled in the casing and having one arm positioned for coaction with the catch to disengage the latter from the segment and the other arm being positioned in the path of travel of the reverse shifting rod of the transmission mechanism whereby said bell crank lever will be actuated when it is desired to operate the transmission shaft in a reverse direction.

2. In a device of the kind described, the combination with an automobile transmission shaft, of a casing surrounding said transmission shaft and held in a stationary position, a segment pivoted at one end within said casing and having its convex face adjacent the shaft and provided with a keeper notch adjacent its free end, a catch pivoted intermediate its ends in the casing so as to engage the keeper notch in the free end of the segment, mechanism for disengaging said catch from the keeper notch, and braking means located in the segment for co-action with the transmission shaft.

3. In a device of the kind described, the combination with an automobile transmission shaft, of a casing surrounding said shaft and held in a stationary position, a segment pivoted at one end within the casing and having a keeper notch at its free end, a braking means carried by the segment and co-acting with said transmission shaft, a catch pivoted intermediate its ends back of the said segment and co-operating with the keeper notch to hold the segment in an operative position, a spring to normally move said catch into engagement with the keeper notch, and means to disengage said catch from the keeper notch.

4. A semi-automatic non-backing automobile brake consisting of a casing, an arcuate segment pivoted at one end within an aperture in said casing, which aperture communicates with a shaft receiving opening through said casing, said segment having a keeper notch in the convex edge thereof adjacent its free end, a catch pivoted intermediate its ends in the casing so as to engage the keeper notch, and mechanism to disengage said catch from the keeper notch to release the segment.

OTIS B. HUNT.